United States Patent [19]

Toyomura

[11] 4,431,866

[45] Feb. 14, 1984

[54] ELECTRONIC APPARATUS WITH VOCAL OUTPUT

[75] Inventor: Shigeru Toyomura, Kawasaki, Japan

[73] Assignee: Canon Kabushiki Kaisha, Tokyo, Japan

[21] Appl. No.: 485,381

[22] Filed: Apr. 19, 1983

Related U.S. Application Data

[63] Continuation of Ser. No. 194,988, Oct. 8, 1980, abandoned.

[30] Foreign Application Priority Data

Oct. 15, 1979 [JP]  Japan .................................. 54-132570

[51] Int. Cl.³ .............................................. G10L 1/00
[52] U.S. Cl. ........................................ 381/51; 364/710
[58] Field of Search ............ 179/1 SM; 364/706, 709, 364/710, 745, 200

[56] References Cited

U.S. PATENT DOCUMENTS 4,185,169  1/1980  Tanimoto et al. ............... 179/1 SM
4,258,418  3/1981  Heath ................................... 364/200

Primary Examiner—Emanuel S. Kemeny
Attorney, Agent, or Firm—Fitzpatrick, Cella, Harper & Scinto

[57] ABSTRACT

An electronic apparatus capable of producing a voiced output representing various data input thereto and the results of operations on the input data includes a system for inhibiting the voiced output of data that is unnecessary to the operator. For example, when input data overflows the apparatus, a voiced output indicative thereof is inhibited. As another example, when input data or the result of an operation is a whole number, a voiced output indicative of decimal point location is inhibited. As still another example, if key entries are made too rapidly to permit a voiced output, such output is inhibited.

11 Claims, 9 Drawing Figures

| X | 10 | 9 | 8 | 7 | 6 | 5 | 4 | 3 | 2 | 1 | DP |
|---|----|---|---|---|---|---|---|---|---|---|----|
| 0 | 0  | 0 | 0 | 0 | 0 | 1 | 2 | 0 | 4 | 5 | 2  |
FIG. 2A
| X | 10 | 9 | 8 | 7 | 6 | 5 | 4 | 3 | 2 | 1 | DP |
|---|----|---|---|---|---|---|---|---|---|---|----|
| 0 | 0  | 0 | 0 | 0 | 0 | 1 | 2 | 0 | 4 | 5 | 0  |
FIG. 2B
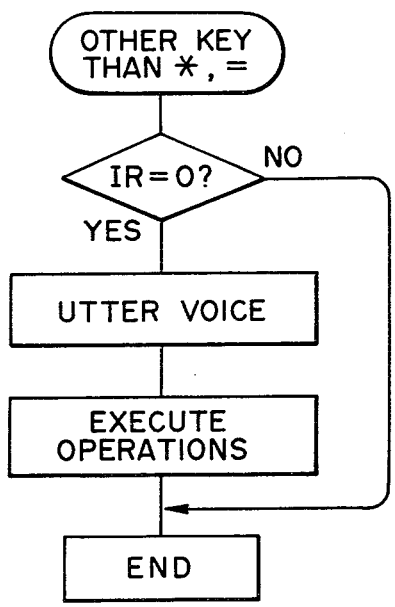
FIG. 4A
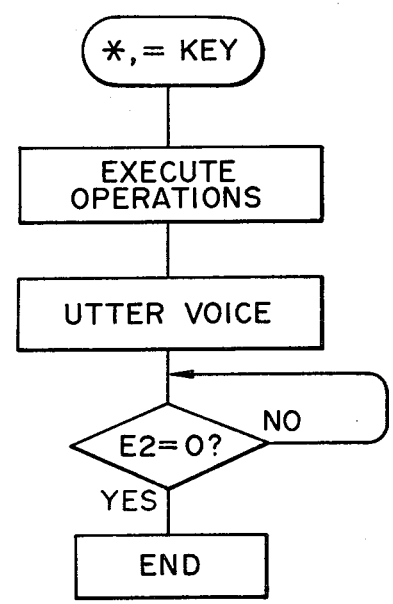
FIG. 4B

ELECTRONIC APPARATUS WITH VOCAL OUTPUT

This application is a continuation of application Ser. No. 194,988 filed Oct. 8, 1980 now abandoned.

BACKGROUND OF THE INVENTION

1. Field of the Invention

The present invention relates to an electronic apparatus functioning the output data in a synthesized voice through a voice synthesizer.

2. Description of the Prior Art

There have been some electronic apparatus such as certain computers in which the operator is informed, by a voice, of numeral data input thereto or output therefrom or of operational data keyed thereto. However, these voice outputs often contain data unnecessary to the operator.

SUMMARY OF THE INVENTION

Accordingly, it is an object of the invention to provide an electronic apparatus which is able to prevent unnecessary data from being produced from the apparatus as vocal output when data stored in the apparatus are produced by a voice.

More particularly, it is an object of the invention to provide a computer which does not inform the operator of all of the numeral data or operational data keyed thereto but which informs the operator by voice of only such data necessary to him by determining which data is unnecessary to him as vocal ouput.

It is another object of the invention to provide a computer which automatically informs an operator of the results of operation by voice and which can inform the operator only of the numeral data of the results relating to operation without data of an unnecessary decimal point if the results of operation include only whole numbers.

In the type of computer which informs an operator by voice when an ineffective key operation is made, for example, when a keyed-in number overflows the maximum number of positions provided in the apparatus, such keyed numeral data is not introduced into the computer but rather is ineffective.

Therefore, it is a further object of the invention to provide a computer which produces no voice information in the case of such ineffective key operation.

For conventional desk calculators with a printer there is usually provided a key [C E] (CLEAR ENTRY key) the function of which is to clear only the numeral data just keyed in but not to clear the remaining data. The key clears the numeral data keyed in by a so-called numeral key and a point key only immediately after these keys are operated. In this case, the words "clear entry" are uttered in voice from the voice synthesizer. After keying of other keys such as [+] [−] [×] [÷] [*] [=] and so on, the clear entry key does not carry out any clearing operation, that is, it becomes ineffective.

Therefore, it is still a further object of the invention to provide a computer or calculator which does not utter the words "clear entry" in the above case.

Also, for conventional desk calculators, if the results of an operation overflow the maximum number of positions in the calculator, namely if the state of so-called "overflow" occurs, then only the [C] key can remain effective and key entry of other keys is inhibited. Operation of any other key, if made, is rendered ineffective.

Therefore, it is a further object of the invention to provide a computer or calculator which does identify by voice those keys made ineffective in such a case.

Furthermore, for conventional desk calculators with vocal output, the case sometimes occurs where keys are operated too quickly to permit appropriate words to be uttered completely. Before the utterance of the voice is completed, it is terminated by operating another key and the processing occurs in response. If the next key is also operated too quickly, then the voice of the next key will be incompletely uttered and key processing will proceed further to a step indicated by the next key operated. In this manner, in the case of too quick key operation, the utterance of voice is made only incompletely and therefore the operator does not understand what information is to be indicated by the uttered voice. Such voice is merely troublesome to the operator.

Therefore, it is a further object of the invention to provide a computer or calculator which completely inhibits the utterance of voice in the case of quick key operation as mentioned above.

BRIEF DESCRIPTION OF THE DRAWINGS

Other and further objects, features and advantages of the invention will appear more fully from the following description taken in conjunction with the accompanying drawings, in which:

FIGS. 2A and 2B are explanatory diagrams of storage of the register AR used in the embodiment;

FIGS. 4A and 4B further illustrate the sequence of control.

DESCRIPTION OF THE PREFERRED EMBODIMENTS

Figure 1:
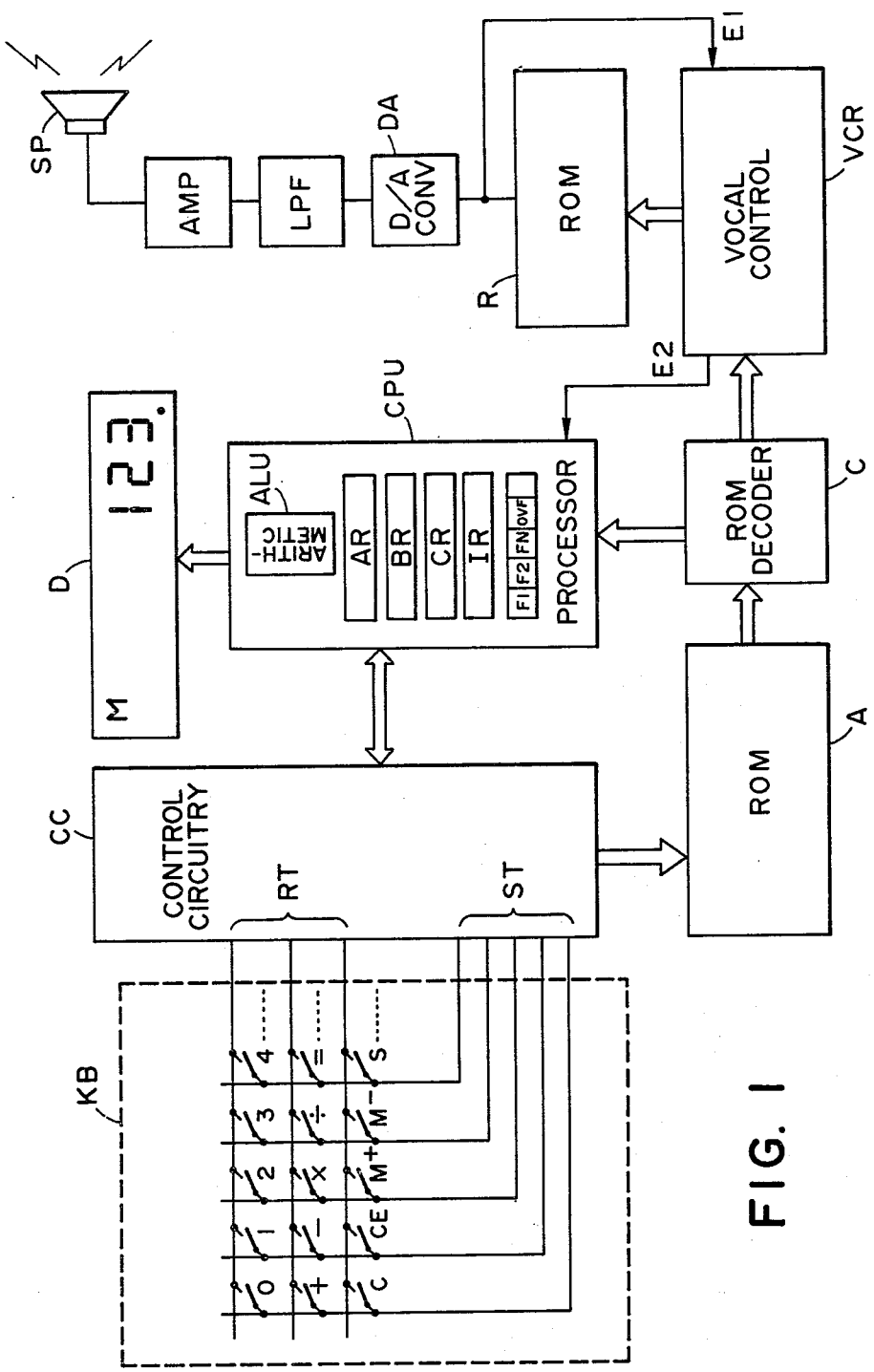
FIG. 1 is a schematic block diagram showing an embodiment of the invention.

In FIG. 1 showing an embodiment of the invention, a keyboard KB is for input of various key data, such as numerals and functions, to the computers. On the keyboard KB there are arranged various keys such as 0 through 9, ·, +, −, ×, ÷, C, CE and so on.

CC designates a control circuitry for sequential control. To discriminate which of the keys is then operated the control circuit develops a key scan signal to the keyboard KB from terminal ST and receives the signal from KB at another terminal RT.

A read-only memory (ROM) stores micro instruction data for sequential control. The read-only memory issues different micro instruction data under the control of the control circuitry CC. In the embodiment shown, data stored in ROM A are processing data necessary for arithmetic operations such as entry and processing, and four-fundamental operation processing data, together with control data for controlling whether or not a vocal output as shown in FIGS. 2C, 3A–3C and 4A and B should be made.

A ROM decoder C receives data from ROM A, decodes the data and produces the decoded instructions.

A processor CPU is an operation unit for carrying out operations, processing and various controls in accordance with the instructions coming from ROM decoder C. CPU contains a register AR for holding data of entered numbers and data of operation results, registers BR and CR for carrying out operations, an arithmetic unit ALU for executing operations, an input buffer register for temporarily storing key codes keyed in, a decoder (not shown) for producing the signals of the data of an entered number and the result of an operation for display and, flag F1, F2, FN and OVF for indicating the internal state of the computer.

A display unit D displays the data entered through the keyboard and results of operations according to the outputs from the processor CPU. The display unit may be composed of, for example, fluorescent display tubes or liquid crystal indicators.

A vocal read-only memory (ROM) R stores digital data for voice output. The following groups of words are stored in this ROM R in the form of digitally coded signals:

Zero, one, two, three, four, five, . . . , plus, minus, multiplied by, divided by, clear, clear entry overflow, . . . and so on.

A vocal control VCR produces address data for access to the vocal ROM R. To make the audible output of the above words, "one", "two", "three", "four" or the like, ROM decoder C applies to the vocal control VCR a digital code signal to instruct which word should be uttered. After discriminating the digital code signal, the vocal control VCR accesses the vocal ROM R and makes it produce the instructed vocal digital data.

The vocal digital data is introduced into a digital-to-analog converter DA which converts the digital data into an analog form. The converted data is then introduced into a low-pass filter LPF to pass the analog audio signals. After being amplified by an amplifier AMP, the audio signals are applied to a loud speaker SP. Thus, a voice of the selected words is uttered through the speaker SP.

On the other hand, the output from the vocal ROM R is put into the vocal control VCR as E1 signal informing of the end of the vocal digital data of one word or group of words. Thus, the E1 signal serves also as an end signal for ending the utterance of voice of one word group. The vocal control VCR detects this signal E1 to terminate the utterance of one word group. At the same time, VCR transfers a signal E2 to the processor CPU to inform it of the end of one word group.

In accordance with the present invention the above a computer is arranged as described above.

The operation of the above described apparatus will be explained hereinafter with reference to the processing sequences shown in FIGS. 2A to 4B. These processing sequences are all stored in the read-only memory A.

As previously noted, according to the invention, unnecessary information about a decimal point is not generated when the result of an operation is a whole number. At first, this processing will be described with reference to FIGS. 2A and 2B.

In FIGS. 2A and 2B there is shown the register AR included in the above-described operation CPU. The register AR has storage capacity to store operational results in ten digit positions. The position indicated by DP is a point position alloted for indication of a decimal point and positions D1 to D10 are for registering digits. Position X is an overflow position used in operation.

In the case shown in FIG. 2A, there is digit "2" in the position DP and therefore the result of operation stored in the register represents "120. 45" which is not a whole number. In contrast, in the case shown in FIG. 2B there is "0" in the position DP and therefore the result of operation stored therein represents "12045." which is a whole number.

The operation in the case of FIG. 2A where the result of operation is not a whole number will be discussed below.

Figure 2C:
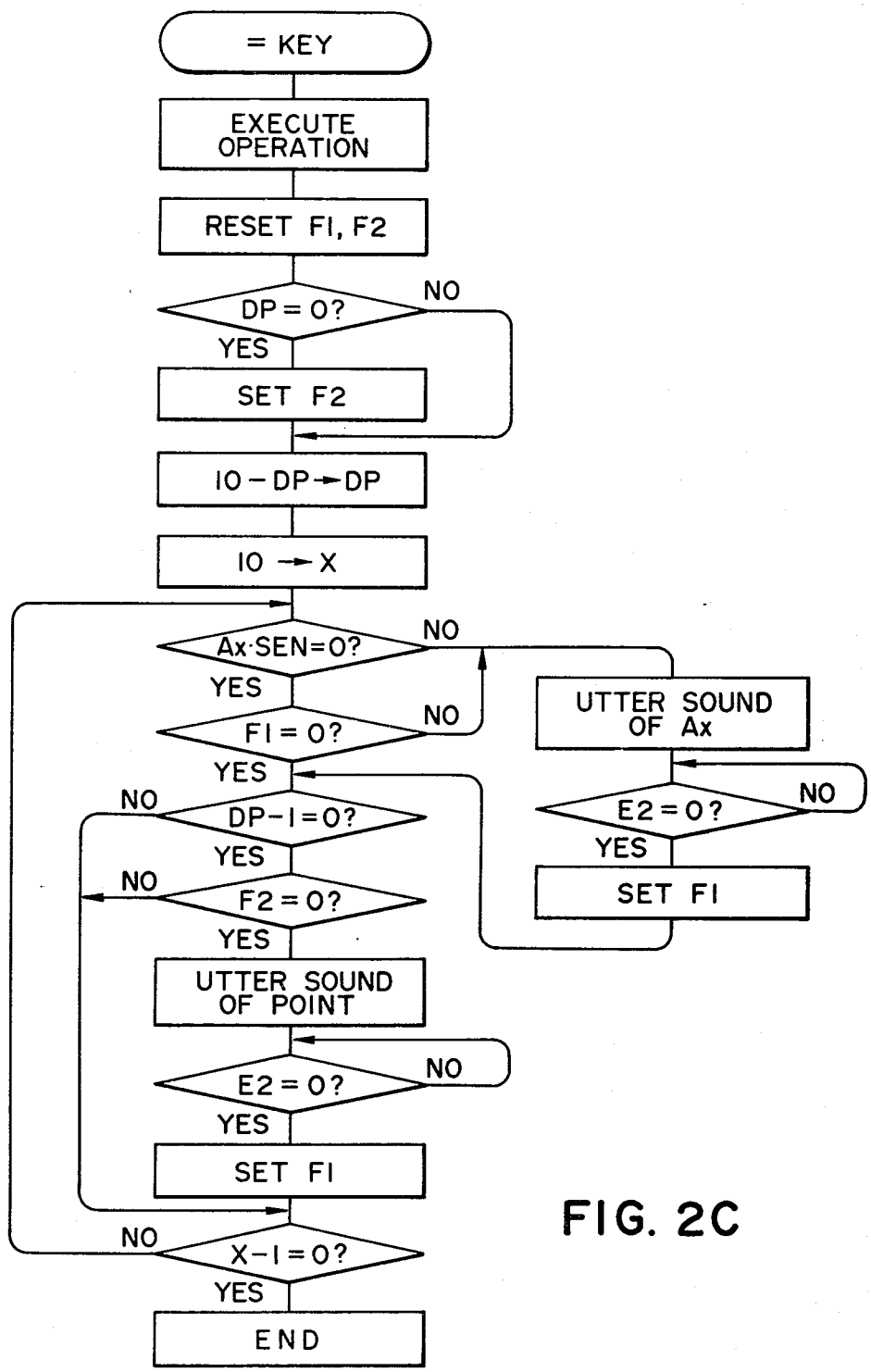
FIG. 2C illustrates the sequence of control of the apparatus shown in FIG. 1.

When the operator operates an operation result computing key such as the [=] key on the keyboard KB, the control circuitry CC detects it and ROM A issues an instruction to execute the operation the sequences of which are shown in FIG. 2C. Thereby an operation is executed in the processor CPU. The step of "Execute Operation" involves ordinary addition, subtraction, multiplication and division. The technique necessary therefore is well known in the art of computers and therefore need not be further described. The result obtained by the operation is, in this case, such as shown in FIG. 2A which is not a whole number.

At the next step, an instruction "Reset F1, F2" is executed to store the state of the computer. Flags F1 and F2 are reset to "0" by the processor CPU. Then, at the step of "DP=0", determination is made of whether the register AR has "0" in its point position or not. In the example now being described, there is "2" in the position DP and the answer is "No". Therefore, the instruction "SET F2" is not executed but the next instruction "10−DP→DP" is executed. Namely, "2" appearing in the DP position in the register AR is subtracted from 10 and the answer "8" is stored in DP.

At the step of "10—X", numeral "10" is stored in the position X of the register. At the next step, "Ax·SEN=0", it is checked whether the register AR has "0" or not in the position corresponding to the content in the position X of the register. Namely, since the content in the position X is now "10", a decision is made to check whether the content in 10th position of the register AR is "0" or not. In the case now being discussed, the content in the 10th position of AR is "0" and therefore the answer is "Yes". The sound of the number is not uttered for this position and the step is advanced to "F1=0" where it is checked whether flag F1 is "0" or not. Since the answer is "Yes" and therfore the step is advanced to "DP−1=0". By this instruction, "8−1=7" is executed and the result "7" is registered in the position DP. Since it is not "0" and the answer is "No", the sequence flows in the direction of the branch "No" toward the step of "X−1=0". At this step, "10−1=9" is executed and "9" is registered in the position X. Since the position X is not "0" but "9", the answer is "No". Therefore, the next step is transferred to "Ax·SEN=0". There is now "9" in the position X and therefore decision is made as to the 9th position of AR this time in the same manner as above. Since the figure in this position is "0", the same operation as above is carried out thereafter without utterance of sound.

The above procedure is repeated until the figure in the X position of the register becomes "5". For "5" in the X position of the register the instruction "Ax·SEN=0" is executed and the data in the 5th position of the register AR, that is, "1" is detected. Now, the sequence turns to the direction of "No" and the step is jumped to "UTTER SOUND OF Ax". Thereby an instruction is applied to ROM decoder C from ROM A for utterance of the sound of the data "1". ROM decoder C decodes the instruction and produces a digital code signal to make the vocal control VCR generate the sound of "one". The vocal control VCR discriminates the digital code signal and has access to ROM R to make it produce a vocal digital data of "one". The output is introduced into the D/A converter DA. The converted output signal passes through the low-pass filter LPF and the amplifier AMP. Finally the speaker SP utters the sound "one".

During the utterance of "one", the instruction "E2=0" is executed. However, during the sound "one" being uttered, the vocal control VCR issues a signal indicative of the utterance of the sound being on, that is, E2 is "1". Therefore, the answer to the question whether E2=0 continues to be "No" during the utterance of the sound. Consequently, the step is jumped to "No" and the instruction "E2=0" is repeated until the utterance of the sound "one" is completed. Upon the completion of the utterance E2 becomes "0". Since E2=0, the step is advanced to "SET F1" where the flag F1 is set to "1".

After Flag 1 has once been set to "1" in this manner, the sound of "zero" is uttered for numeral "0" in any of the subsequent positions of the register AR where a zero appears. The same routine as described above is repeated for the subsequent positions of the register AR. Namely, "two" is uttered for "2" in the fourth position of AR. The content in the X position is changed to "3" and that in the position DP to "1". Since the content in the third position of AR is "0", the answer to "Ax·SEN=0" is "Yes" this time. Therefore, "F1=0" is executed. Since F1 was set at the previous time, a transfer to "No" takes place and "zero" is uttered. At the next step, "DP−1=0" is executed. This time it is "0" and therefore the answer is "Yes". The step is advanced to "F2=0". In this case, the number stored in the register AR is not a whole number and therefore stored in the register AR is not a whole number and therefore Flag 2 remains reset. Consequently, the sequence flows in the direction of "Yes" and "UTTER SOUND OF POINT" is executed. Thus, the sound "point" is uttered through the speaker SP. After completing the utterance of "point", flag F1 is set and then "X−1=0" is executed. Thereafter, processing is carried out similarly and "four" and "five" are uttered in accordance with the procedure described above. After the utterance of "five", the answer to "X−1=0?" becomes "Yes" and the sequence comes to end.

As described in detail in the above, the utterance of "point" takes place when the result of operation is not a whole number.

In case that the result of operation is a whole number as shown in FIG. 2B, the processing proceeds in the following manner:

Operation of the [=] key initiates the execution of an operation which gives the result shown in FIG. 2B. Then, the instruction "RESET F1, F2" is executed. At the next step, "DP=0 ?" is executed. In the example now being described, the register AR has "0" in its position DP and therefore the answer is "Yes". Consequently, F2 is set to "1" in accordance with the instruction "SET F2". This setting of F2 to "1" produces the result to inhibit the utterance of "point" (decimal point) in the subsequent control sequence.

The manner of operation in this case is essentially the same as in the above case.

Since figures in positions from 10th to 6th of AR are all "0", no sound is uttered for these positions. For the fifth to first position, "one", "two", "zero", "four" and "five" are uttered respectively. At the time point when "five" is uttered, the content in the position X is "1" and that in the position DP is also "1". After the utterance of "five", the sequence proceeds along the branch of "Yes" toward the routine of "UTTER SOUND OF POINT" because 1−1=0 at "DP−1=0". At "F2=0 ?", determination is made as to whether the number in the register is a whole number or not. Since in this case the number is a whole number and F2 has already been set to "1", the sequence proceeds in the direction of "No" and therefore the utterance of the sound "point" is inhibited. Thus, after the execution of "X−1=0", the sequence of operation comes to end in this case.

As understood from the above description, according to the invention the sound "point" is uttered only when the result of operation is not a whole number. When it is a whole number, the sound "point" is not uttered. The sound audibly informing of the point data is not limited to "point" only. It is of course possible to use other words such as "TEN" which means "point" in Japanese.

As aforementioned, according to the invention the utterance of voice is also inhibited when an ineffective key operation is made. The manner of control operation in such a case will be described hereinafter with reference to FIGS. 3A, 3B and 3C.

Figure 3A:
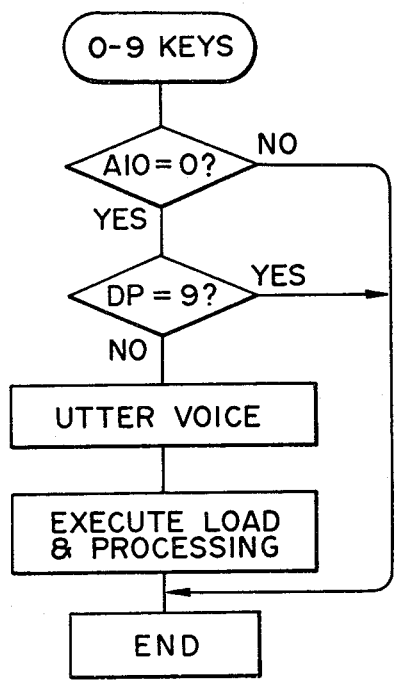
FIGS. 3A, 3B and 3C illustrate also the sequence of control.
Figure 3B:
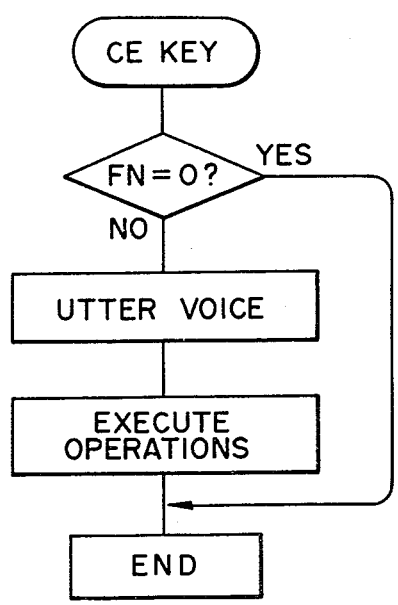

At first, description will be made with reference to FIG. 3A as for the case where a number overflowing the maximum number of positons in the computer is keyed in by the "0" through "9" keys and the [·] key.

In the embodiment now being discussed, the maximum number of positions which the register AR has is 10 and the maximum number registerable in the decimal point position DP is "9".

Under these conditions it is assumed that a number beyond the capacity of the register AR is loaded.

Upon the operation of a numeral key, for example, "1", the first instruction "$A_{10}=0$ ?" is executed. Namely, a determination is made as to whether any numeral data is present in the 10th position of the register AR or not. Since this is the first loading of a number, the answer is "Yes". Therefore, the step is advanced to "DP=9 ?". At this step it is checked whether the content in the point position DP is "9" or not. Namely, it is checked whether the decimal point has overflowed or not. Since there is "0" in DP at present, the answer is "No" and the next operation "UTTER VOICE" is carried out. Thus, the sound of "one" is uttered in the manner previously described. Then an ordinary number entry processing is carried out which is well known in the art of computers. Now, the digit "1" is stored in the register AR. In the same manner, operations are carried out sequentially for the remaining nine positions of the register. Voice is uttered and load processing is carried out every time according to a load key then operated. Now, numeral data are stored in all of ten positions of the register AR. Under this condition if a further key entry is made as an input to the 11th position, then the answer to "$A_{10}=0$ ?" becomes "No" because the content in the 10th position of the register AR is no longer "0". Consequently, the sequence of operation jumps to END without utterance of voice and without execution of load processing.

In the above, description has been made as to the case where the key first operated was a numeral key. However, in another case where the key first operated is the [·] key and the content in the point position overflows, utterance of voice is also inhibited. Namely, in this case, the utterance of voice can be inhibited by the decision of "DP=9".

From the foregoing it can be understood that the present invention provides a computer which does not utter voice when the numeral key entires overflow the maximum positions set in the computer.

As previously noted, the [C E] key is a key for clearing only the loaded data. Now, description will be made of this key with reference to FIG. 3B.

In general, when numeral keys including the point key are operated, at first load processing is carried out and then flag FN is set to "1". Furthermore, this flag FN is reset to "0" by operating any key other than the numeral keys including the point key. For example, if the [C E] key is pushed after key operations of the [1], [2] and [3] keys to register the data of 1, 2 and 3 in the register AR, then "FN=0" is at first executed. However, since in this case, loading of number has already been done and FN has been set to "1" thereby, the sequence proceeds in the direction of No". Therefore, "UTTER VOICE" is executed and the voice "clear entry" is uttered. Subsequently, the register AR is cleared by "EXECUTE OPERATIONS" as the function of the [C E] key.

On the contrary, when any key other than a numeral key is operated, the sequence is turned to "Yes" at "FN=0" because FN has been reset to "0". Therefore, neither utterance of voice nor execution of operation is done in this case.

Figure 3C:
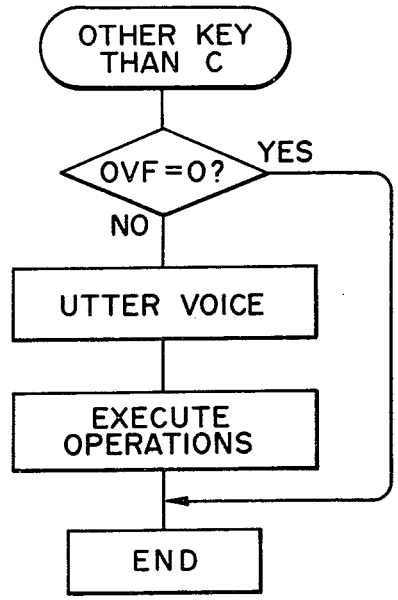

FIG. 3C illustrates the control operations in the case where the computer is placed in the overflow state. In this case, utterance of voice of inhibited for keys other than the [C] key.

In FIG. 3C, OVF designates a flag which is set to "1" when an overflow of operational results occurs. The instruction "OVF=0" to check the presence or absence of OVF is introduced into the rountine for keys other than the [C] key as shown in FIG. 3C. By doing so, it is made possible to prevent utterance of voice of other keys than the [C] key when the computer is placed in the overflow state.

In this manner, in the case of ineffective key operation, the utterance of voice corresponding to the key is inhibited according to the invention.

According to another feature of the invention, utterance of voice is inhibited also in the case of too quick key operations. The control operations in such a case will be described hereinafter with reference to FIG. 4A.

In a desk calculator equipped with a printer there is provided an input buffer register IR. When keys are operated too quickly in the desk calculator, the operation and printing sometimes cannot follow the speed of the key operation. To make it possible for the calculator to correctly execute operations and processing of keys then operated in such a case, it is necessary to temporarily store the codes indicative of the operated key. The input buffer register IR is provided for this purpose.

According to the invention, the content stored in this IR is discriminated and if there are one or more key codes stored in IR then the utterance of voice is inhibited.

In FIG. 4A, when any key other than operation result computing keys, for example, the [+] key is operated, at first the content of the input buffer register IR is discriminated by the instruction "IR=0". If the content is "0" which means that the key operation now in progress is relatively slow and no key code is stored within IR, then the sequence proceeds in the direction of "Yes" and the voice "plus" is uttered by the instruction "UTTER VOICE". However, if there is any key code stored within IR as a result of too quick key operation, then the sequence is turned toward "No" and jumps to END without utterance of voice.

Even when keys are operated too quickly, the voice will be uttered without fail so long as operation result computing keys are concerned. The manner of control in this case is illustrated in FIG. 4B.

For this kind of control, determination of "IR=0" is not carried out. After "EXECUTE OPERATIONS", the next instruction "UTTER VOICE" is executed. Further progress through the routine is delayed until the utterance of voice is completed.

In this manner, there can be provided a computer which does not utter voice in the case of too quick key operations and which utters voice even in the case of too quick key operations so far as operation result computing keys are concerned.

As well understood from the foregoing, the present invention provides a computer which informs the operation by voice of only such data necessary to the operator while detecting the state of operation of the computer and which automatically judges which data should be output as voice and which data should be inhibited from being output as voice.

While the invention has been particularly shown and described with reference to preferred embodiments thereof, it will be understood by those skilled in the art that the foregoing and other changes in form and details can be made therein without departing from the spirit and scope of the invention.

What I claim is:

1. An electronic apparatus for operating on data and including means capable of producing data in the form of a voiced output, comprising:
   input means for entering data;
   detection means for detecting overflow of data entered by said input means and beyond the operational capacity of said apparatus; and
   inhibiting means connected to said detection means for inhibiting production of said data as a voiced output by said producing means when an overflow is detected by said detection means.

2. An electronic apparatus according to claim 1, further comprising a memory for storing a signal representative of an overflow detected by said detection means.

3. An electronic apparatus according to claim 2, further comprising data processor means which includes said detection means.

4. An electronic apparatus, including means capable of producing data, including decimal point information, in the form of a synthetic voiced output, comprising:
   memory means for storing data representing a numerical value;
   detection means for detecting when the numerical value represented by said data is a whole number; and
   inhibiting means connected to said detection means for inhibiting production of decimal point information as a synthetic voiced output by said producing means when said data is a whole number.

5. An electronic apparatus according to claim 4, wherein a portion of said memory stores said decimal point information and its relation to said numerical value, and wherein said detection means is connected to said memory to detect whether said data is a whole number.

6. An electronic apparatus according to claim 5, wherein said detection means includes a second memory for storing the result of the detection of said detection means.

7. An electronic apparatus, including means capable of producing data in the form of a synthetic voiced output, comprising:
  input means having a first key, a second key and a third key;
  detecting means connected to said keys and to said producing means for detecting the states of actuation of said keys and causing said producing means to produce data as a synthetic voiced output in response to actuation of said third key when said third key is actuated successively after actuation of said first key; and
  inhibiting means connected to said detecting means and to said producing means for inhibiting said producing means from producing data as a synthetic voiced output in response to actuation of said third key detected by said detecting means when said third key is actuated successively after actuation of said second key.

8. An electronic apparatus according to claim 7, further comprising a memory connected to said detecting means for storing information indicating when said second key has been actuated.

9. An electronic apparatus, including means capable of producing data in the form of a voiced output, comprising:
  input means having a plurality of keys for entering data into said apparatus;
  input buffer means connected to said input means for storing a series of data entered by said input means;
  detecting means connected to said input means for detecting whether the interval of time between successive actuation of keys of said plurality of keys is at least equal to a predetermined time sufficient to permit said producing means to properly produce data entered by said keys in the form of a voiced output, said detecting means producing the results of the detection in accordance with the content of said input buffer means; and
  inhibiting means connected to said detecting means for inhibiting production of said data entered by said keys as a voiced output by said producing means when said detected interval is less than said predetermined time.

10. An electronic apparatus according to claim 9, wherein said detecting means includes means for storing the result of said detection thereby.

11. An electronic apparatus, including means capable of producing information in the form of a synthetic sound, comprisng:
  input means having a plurality of keys for entering information;
  a status memory for storing an operational state of said apparatus existing when said information entered by said input means may not properly be produced by said producing means as a synthetic sound; and
  inhibiting means connected to said status memory for inhibiting the entry of said information by said input means and for inhibiting the operation of said producing means to produce information as a synthetic sound, when said operational state of said apparatus is stored in said status memory.

* * * * *

UNITED STATES PATENT AND TRADEMARK OFFICE
CERTIFICATE OF CORRECTION

PATENT NO. : 4,431,866
DATED : February 14, 1984
INVENTOR(S) : Shigeru Toyomura

It is certified that error appears in the above-identified patent and that said Letters Patent is hereby corrected as shown below:

Col. 2, line 26, change "conjunction" to --connection--.

Col. 4, line 41, change "therfore" to --therefore--.

Col. 5, lines 34/35, delete "stored in the register AR is not a whole number and therefore--.

Col. 7, line 3, change "entires" to --entries--;

line 30, change "of" (second occurrence) to --is--;

line 35, change "rountine" to --routine--.

Col. 8, lines 19/20. change "operation" to --operator--.

Col. line 20, change "comprisng" to --comprising--.

Signed and Sealed this

Thirteenth Day of November 1984

[SEAL]

Attest:

GERALD J. MOSSINGHOFF

Attesting Officer          Commissioner of Patents and Trademarks